United States Patent [19]
Chen

[11] Patent Number: 5,612,994
[45] Date of Patent: Mar. 18, 1997

[54] INTERPHONE SYSTEM

[76] Inventor: Jhy-ping Chen, 1st Fl., No. 5, Hsichou 2nd St., Chungli City, Taiwan

[21] Appl. No.: 392,128

[22] Filed: Feb. 22, 1995

[51] Int. Cl.$^6$ ............ H04M 9/00; H04M 11/00; H04N 7/14
[52] U.S. Cl. ............ 379/167; 379/103; 379/102; 348/14
[58] Field of Search ............ 379/102, 103, 379/167, 170, 171, 172; 348/13, 14, 15, 16, 17, 18, 156

[56] References Cited

U.S. PATENT DOCUMENTS

| | | | |
|---|---|---|---|
| 4,075,659 | 2/1978 | Desanti | 348/156 |
| 4,370,675 | 1/1983 | Cohn | 348/156 |
| 4,937,855 | 6/1990 | McNab et al. | 379/103 |
| 4,959,713 | 9/1990 | Morotomi et al. | 348/156 |
| 5,032,820 | 7/1991 | Tanikawa et al. | 379/103 |
| 5,142,604 | 8/1992 | Lee | 348/156 |
| 5,428,388 | 6/1995 | Von Bauer et al. | 379/103 |

*Primary Examiner*—Curtis Kuntz
*Assistant Examiner*—Paul Loomis
*Attorney, Agent, or Firm*—Kolisch, Hartwell, Dickinson, McCormack & Heuser

[57] ABSTRACT

An interphone system includes an outdoor interphone device and a plurality of indoor interphone devices each of which is connected to the outdoor interphone device via a common interphone line, a plurality of televisions electrically connected to a camera which monitors areas around a lobby door and sends an image taken therefrom to the televisions. The outdoor interphone device includes a keypad for outputting a specific signal representing one of the indoor interphone devices upon depression by a visitor. Each of the indoor interphone devices includes a telephone set and a switching device which electrically connects the telephone set to the outdoor interphone device when the specific signal from the outdoor interphone device is received by the indoor interphone device and electrically connects the telephone set to a corresponding telephone line from a telephone exchange when an external telephone call is detected by the indoor interphone device, and a device for setting the television into an audio/video input mode to show the visitor image when a receiver of the telephone set is picked up upon connection of the telephone set and the outdoor interphone device.

2 Claims, 4 Drawing Sheets

5,612,994

INTERPHONE SYSTEM

BACKGROUND OF THE INVENTION

1. Field of the Invention

The present invention relates to an interphone system, and more particularly to one which utilizes existing telephone sets and televisions to communicate and monitors a visitor.

2. Description of the Prior Art

Interphone systems are commonly used in multi-story buildings, especially apartment buildings. Most advanced interphone systems include an outdoor phone set installed in the lobby door, a plurality of indoor interphone sets each of which is installed in a corresponding apartment, a monitor installed in a corresponding apartment, and an electric lock control device installed in each indoor interphone set. Usually the indoor interphone set, the monitor, and the electric lock control device are installed together beside a front door of each apartment. Therefore, a resident (user) can see a visitor from the monitor, communicate with the visitor by the indoor interphone set, and decide whether or not to open the lobby door by operating the electric lock control device. The conventional interphone system works well but has a high cost. For example, the conventional interphone system requires many telephone lines for interconnecting the outdoor set with all the indoor interphone sets and many monitors for all the apartments. However, each apartment could utilize its telephone set and television set to replace the indoor interphone set and the monitor, thereby reducing costs.

SUMMARY OF THE INVENTION

The primary objective of the present invention is to provide an improved interphone system which utilizes existing telephone sets and televisions to monitor and communicate with a visitor.

In accordance with one aspect of the invention, there is provided an interphone system which includes an outdoor interphone means and a plurality of indoor interphone means each of which is connected to the outdoor interphone means via an interphone line, a plurality of televisions electrically connected to a camera which monitors areas around a lobby door and sends an image taken therefrom to the televisions. The outdoor interphone means includes a keypad for outputting a specific signal representing one of the indoor interphone means upon depression by a visitor. Each of the indoor interphone means comprises a telephone set and a switching means which electrically connects the telephone set to the outdoor interphone means when the specific signal from the outdoor interphone means is received by the indoor interphone means and electrically connects the telephone set to a corresponding telephone line from a telephone exchange when an external telephone call is detected by the indoor interphone means, and means for setting the television into an audio/video input mode to show the visitor image when a receiver of the telephone set is picked up upon connection of the telephone set and the outdoor interphone means.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
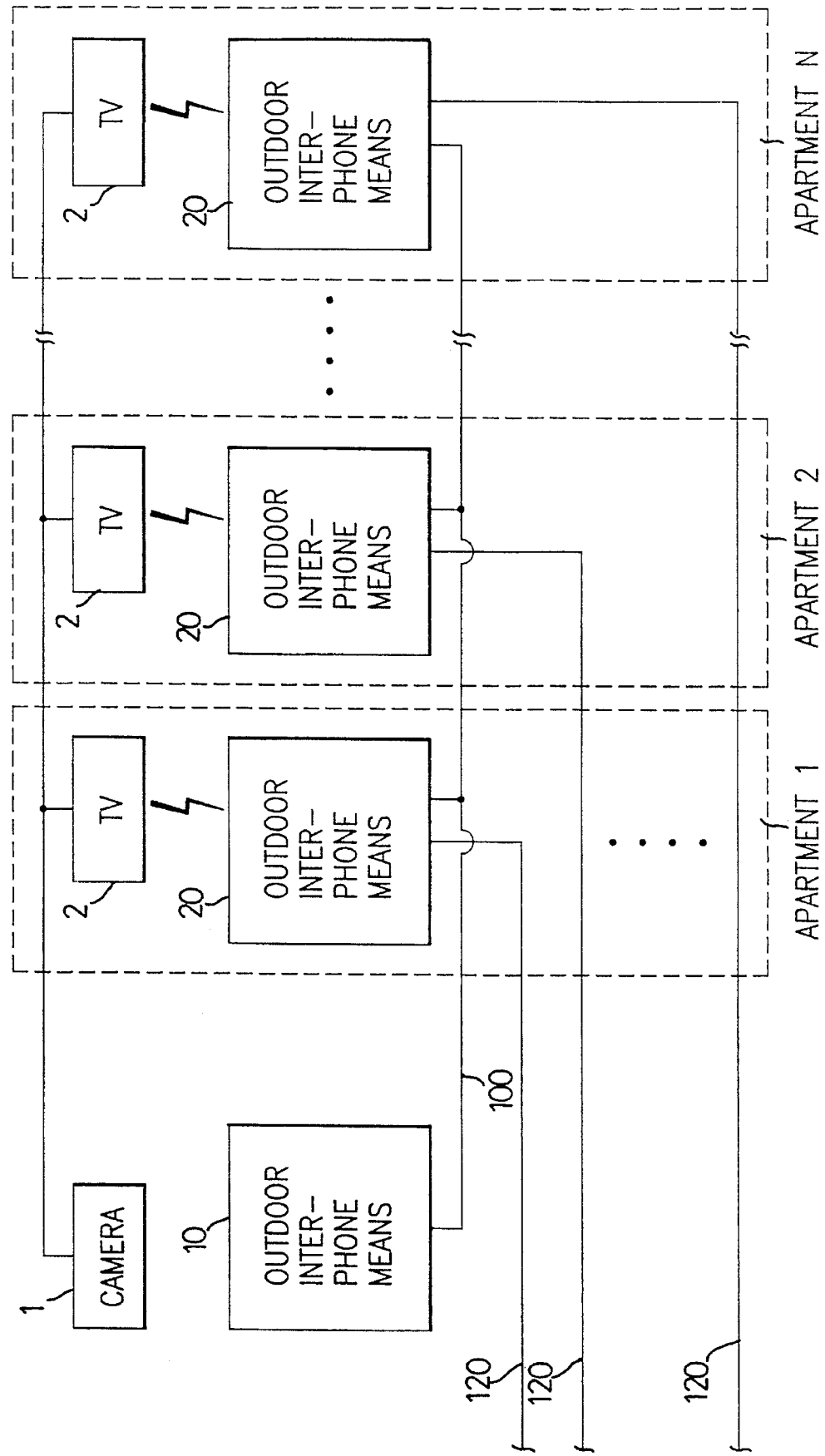
FIG. 1 is a schematic diagram of an interphone system in accordance with the present invention.

Referring to the drawings and initially to FIG. 1, an interphone system in accordance with the present invention comprises an outdoor interphone means 10 and a plurality of indoor interphone means 20 each of which is connected to the outdoor interphone means 10 via a common interphone line 100. A camera 1 is installed above a lobby door of an apartment building which includes a plurality of apartments such as apartment 1, apartment 2, to apartment N. Each apartment is installed with a television 2 and one of the indoor interphone means 20. The camera 1 monitors areas around the lobby door and sends an image taken therefrom to the televisions 2. The camera 1 is electrically connected to an audio/video input terminal of the televisions 2 and inputs images to the televisions 2. The images can be shown on any one of the televisions 2 when the television 2 is turned on and set in an audio/video input mode.

Figure 2:
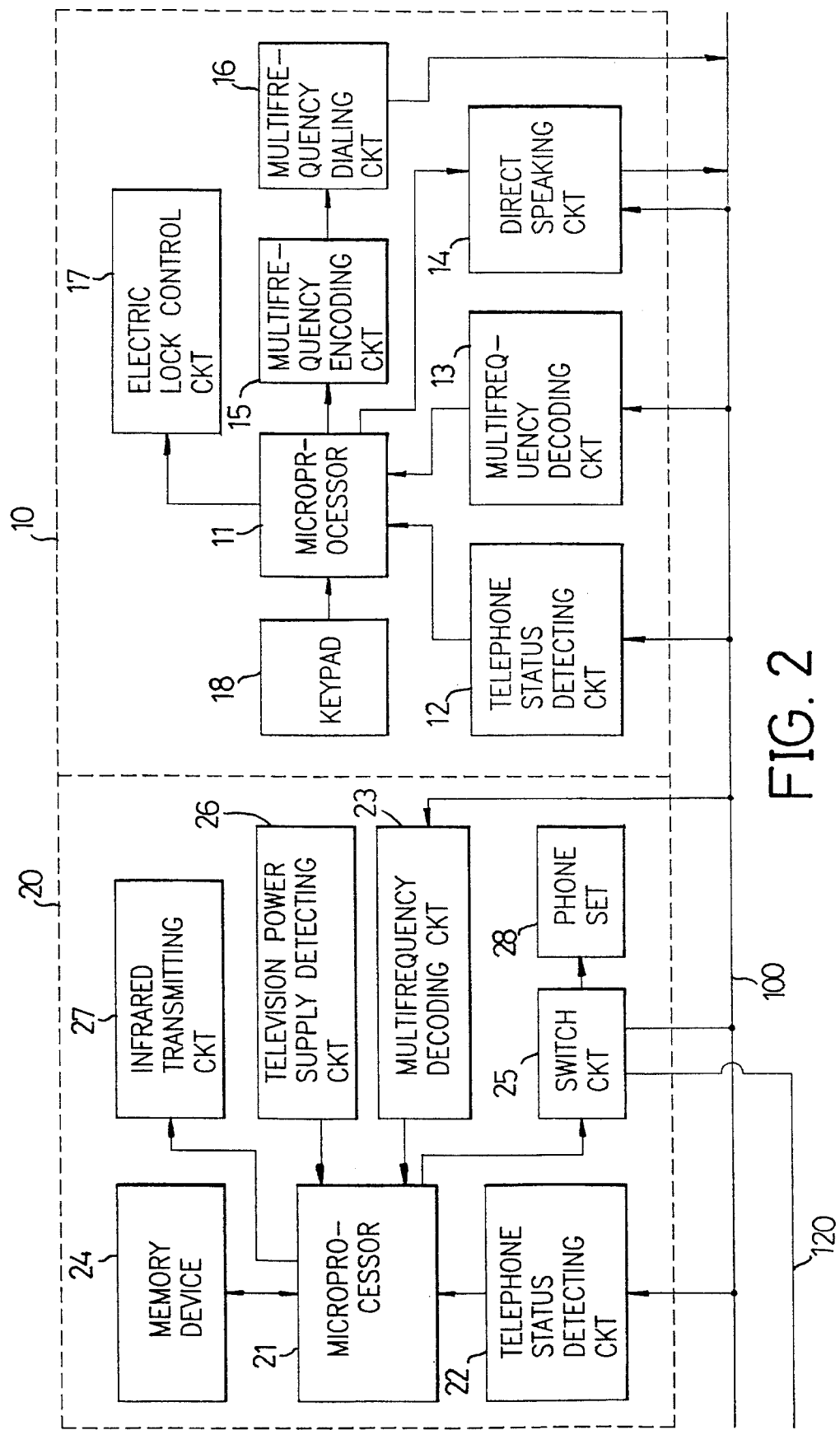
FIG. 2 is a block diagram of an interphone system in accordance with the present invention where an outdoor interphone means and merely one of a plurality of indoor interphone means are illustrated for simplification.

Referring to FIG. 2, a detailed block diagram of the outdoor interphone means 10 and the indoor interphone means 20 is shown. Since all the indoor interphone means 20 are identical, for simplification, merely one of the interphone means 20 is shown. The outdoor interphone means 10 comprises a microprocessor 11, a telephone status detecting circuit 12 connected between the microprocessor 11 and the interphone line 100, a multifrequency decoding circuit 13 connected between the microprocessor 11 and the interphone line 100, a direct speaking circuit 14 connected between the microprocessor 11 and the interphone line 100, a multifrequency encoding circuit 15 connected to the microprocessor 11, a multifrequency dialing circuit 16 connected between the multifrequency encoding circuit 15 and the interphone line 100, an electrical lock control circuit 17 connected to the microprocessor 11, and a keypad 18 connected to the microprocessor 11. The electric lock control circuit 17 is electrically connected to a conventional electric lock (not shown) which is installed in the lobby door of the apartment building. The electric lock control circuit 17 releases the electric lock when it is activated.

The indoor interphone means 20 comprises a microprocessor 21, a telephone status detecting circuit 22 connected between the microprocessor 21 and the interphone line 100, a multifrequency decoding circuit 23 connected between the microprocessor 21 and the interphone line 100, a memory device 24 storing an apartment number and being connected to the microprocessor 21, a switching circuit 25 connected between the microprocessor 21 and a telephone set 28, a television power supply detecting circuit 26 connected to the microprocessor 21, and an infrared transmitting circuit 27 connected to the microprocessor 21.

The keypad 18 includes a plurality of keys each of which corresponds to an apartment number of the apartment building. The dialed apartment number corresponds to a destination apartment which the visitor wants to call (visit). When a visitor depresses a key of the keypad 18, the microprocessor 11 outputs a signal which corresponds to the depressed key, i.e., to the destination apartment in the apartment building. The multifrequency encoding circuit 15 encodes the signal from the microprocessor 11 into a destination code which represents the apartment number of the destination apartment. The multifrequency dialing circuit 16 dials to a corresponding indoor interphone means 20 via the interphone line 100 according to the encoded destination code. Each indoor interphone means 20 in the apartment building receives and decodes the dialed number into a data code by means of the multifrequency decoding circuit 23 thereof. The microprocessor 21 in each indoor interphone means 20 receives the decoded data code and checks whether or not the received data code accords with the number codes in the memory device 24. It is quite clear that only when the microprocessor 21 in the indoor interphone means 20 of the destination apartment checks positive that the received data code accords with the number code in the memory device 24, while other microprocessors 21 in the nondestination apartments checks negative. The microprocessor 21 in the destination apartment outputs a signal to activate the switching circuit 25, which in turn electrically connects the interphone line 100 to the telephone set 28 and causes the indoor interphone means 20 to ring with a sound other than a normal telephone call. However other microprocessors 21 in other apartments other than the destination apartment will check negative and still retain the switching circuit 25 in an inactive status. When the user hears the ringing and picks up a receiver of the telephone set 28, a voltage level of the interphone line 100 drops to a lower level. The telephone status detecting circuit 12 of the outdoor interphone means 10 detects the dropping of the voltage level on the interphone line 100 and outputs a signal to inform the microprocessor 11, which in turn activates the direct speaking circuit 14. The user is allowed to talk with the visitor upon activation of the direct speaking circuit 14. After the user identifies the visitor, he/she may depress a specific key on the handset 28, which in turn outputs a lock releasing signal to the multifrequency decoding circuit 13 of the outdoor interphone means 10 via the interphone line 100. The multifrequency decoding circuit 13 decodes the lock releasing signal into a digital signal and outputs the decoded digital signal to the microprocessor 11, which in turn outputs a triggering signal to the electric lock control circuit 17. The electric lock control circuit 17 releases the lock upon reception of the triggering signal from the microprocessor 11.

As mentioned previously, the camera 1 installed above the lobby door is electrically connected to all the televisions 2 of the apartment building, therefore when any resident turns on his/her television 2 and switches the television 2 to an audio/video input mode, the visitor image will be shown on the television screen. The infrared transmitting circuit 27 transmits a remote control signal to set the television 2 into the audio/video input mode when the microprocessor 21 receives the decoded data code which represents the destination apartment number dialed from the multifrequency dialing circuit 16. Therefore, the resident can see the visitor on his/her television 2 when the telephone set 28 rings. The microprocessor 21 commands the infrared transmitting circuit 27 to emit a signal to set the television 2 into the television mode when the resident hangs up the receiver of the telephone set 28.

If a normal telephone call signal is sent to the telephone line 120, the telephone set 28 rings as a normal telephone call-in ringing to inform the user.

Figure 3:
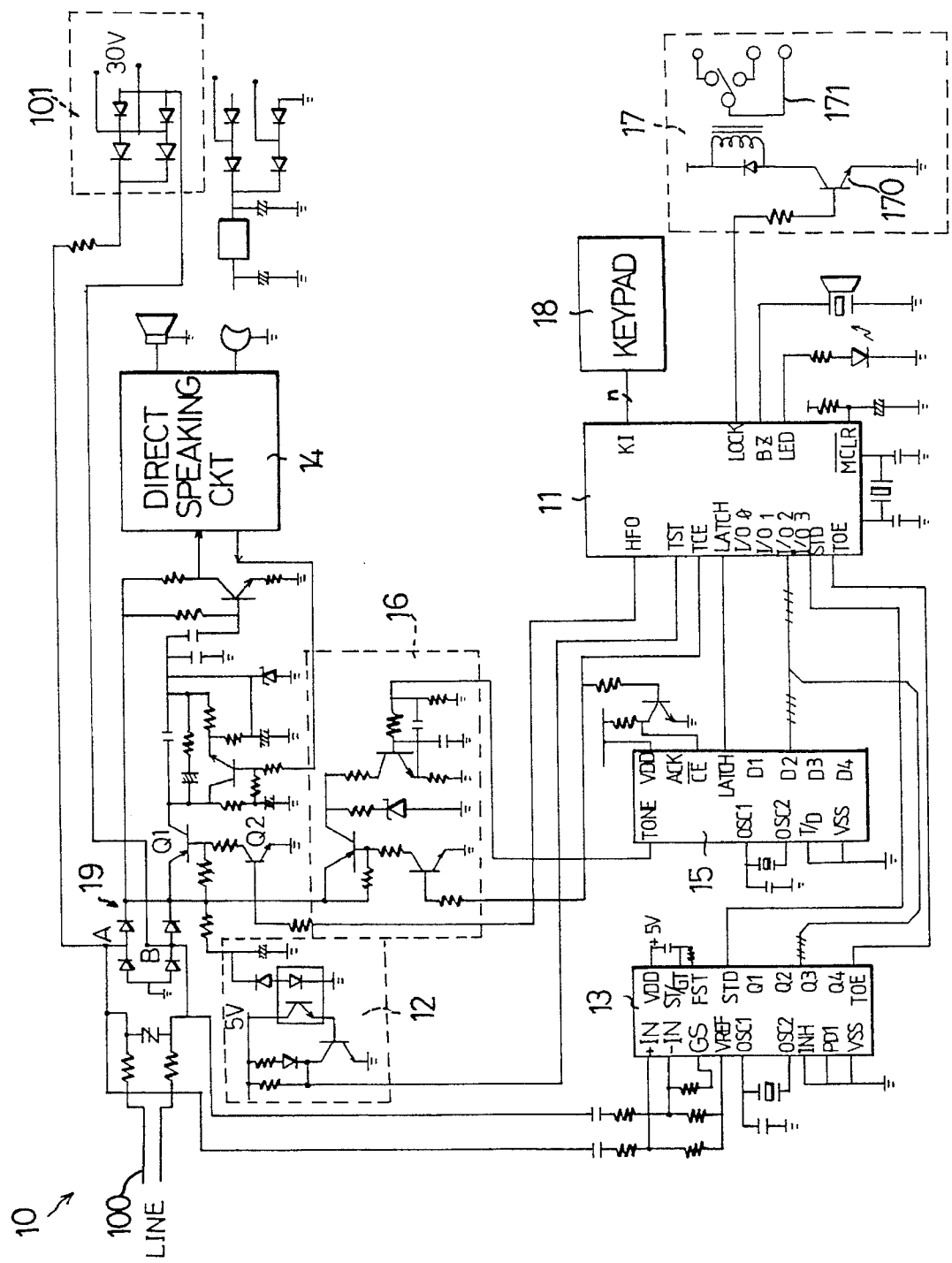
FIG. 3 is a detailed of the outdoor interphone set circuit.

FIG. 3 is a detailed circuit of the outdoor interphone means 10 of the present invention. The microprocessor 11 comprises a testing pin TST connected to the telephone status detecting circuit 12, a first latch pin LATCH connected to a second latch pin LATCH of the multifrequency encoding circuit 15, four Input/output pins I/O 0, I/O 1, I/O 2, I/O 3 respectively connected to four data pins D1, D2, D3, D4 of the multifrequency encoding circuit 15, pins STD and TOE respectively connected to pins STD and TOE of the multifrequency decoding circuit 13, pin TCE connected to pin TCE of the multifrequency dialing circuit 16, pin LOCK connected to the electric lock control circuit 17, input port KI connected to the keypad 18. The telephone status detecting circuit 12 is connected to the interphone line 100 via a first transistor Q1 and a bridge rectifier 19. The interphone line 100 is connected to the multifrequency decoding circuit 13 and the indoor interphone means 20 respectively via terminals A, B of the bridge rectifier 19 and connected to the direct speaking circuit 14 via the bridge rectifier 19 and the first transistor Q1. A current supplier 101 is connected to the two terminals A and B of the bridge rectifier 19 for providing an alternating voltage of 30 volts to the interphone line 100. The multifrequency encoding circuit 15 is connected to the multifrequency dialing circuit 16 via a pin TONE thereof. The multifrequency dialing circuit 16 has an output thereof connected to the interphone line 100 via the bridge rectifier 19. The microprocessor 11 has a pin HFO connected to the base of the first transistor Q1 via a second transistor Q2. The telephone status detecting circuit 12 detects a voltage level drop on the interphone line 100 and activates the microprocessor 11 to output a logical high signal from the pin HFO thereof when the user picks up the receiver of the telephone set 28. A logical high signal on the pin HFO activates the transistors Q2 and Q1 thus electrically connecting the direct speaking circuit 14 to the interphone line 100. A visitor can talk with the resident by means of the direct speaking circuit 14 when the direct speaking circuit 14 is activated.

The multifrequency decoding circuit 13 of the outdoor interphone means 10 receives a lock release signal from the indoor interphone means 20 via the interphone line 100. The lock release signal is decoded by the multifrequency decoding circuit 13 and the decoded signal is sent to the microprocessor 11, which in turn outputs a logical high signal at a pin LOCK to activate the electric lock control circuit 17 to release an electric lock (not shown) on the lobby door. The electric lock control circuit 17 comprises a transistor 170 connected to a relay 171. The relay 171 is energized when the microprocessor 11 outputs the logical high signal from the pin LOCK to activate the transistor 170.

Figure 4:
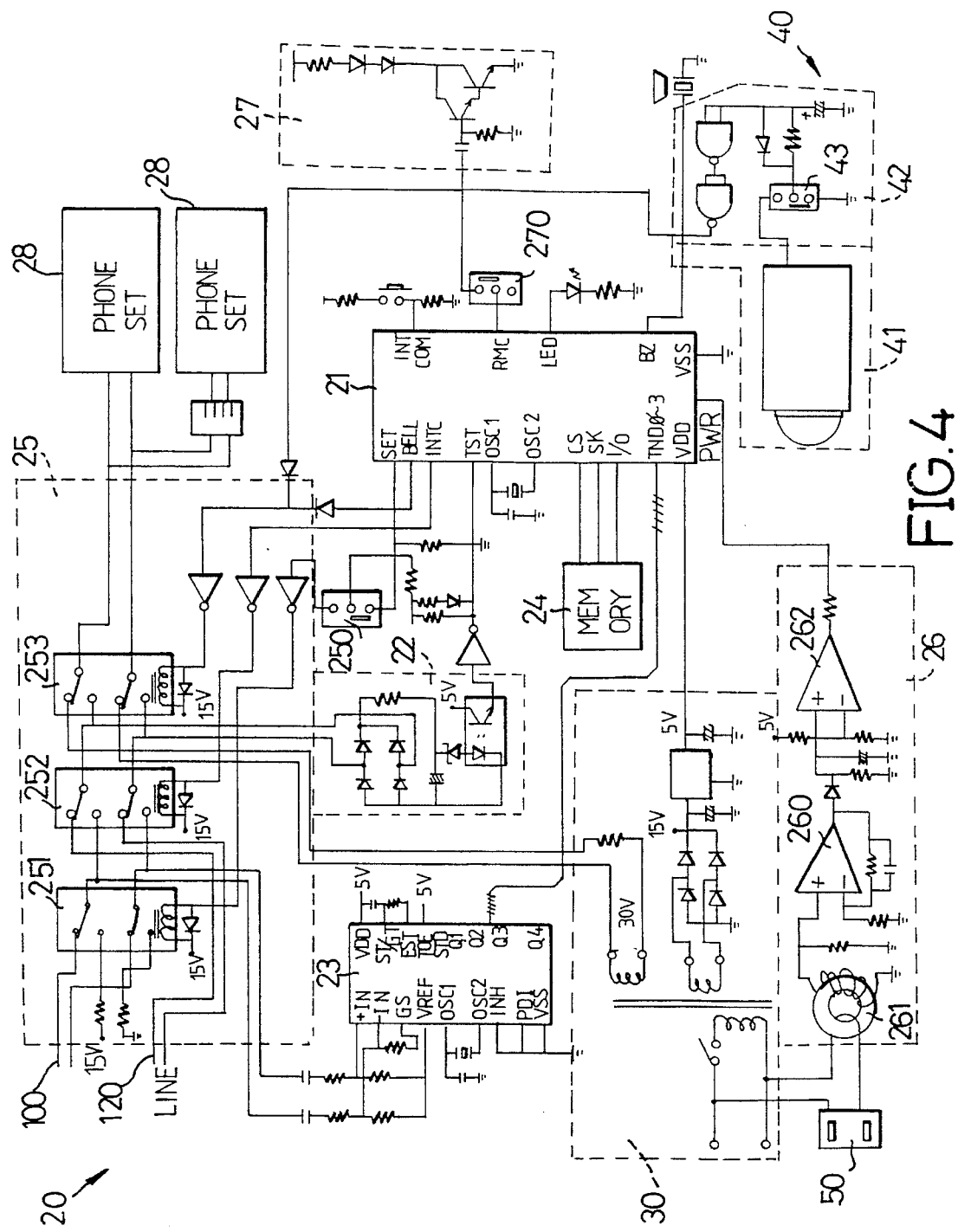
FIG. 4 is a detailed of the indoor interphone set circuit.

FIG. 4 is a detailed circuit of the indoor interphone means 20. The microprocessor 21 comprises a testing pin TST connected to the telephone status detecting circuit 22, four input pins TND0 to TND3 connected to four data pins Q1 to Q4 of the multifrequency decoding circuit 23, pins CS, SK, and pin I/O connected to the memory device 24 which is an EEPROM. Pins SET, BELL, and INTC are connected to the switching circuit 25, where a switch 250 is connected between pin SET and the switching circuit 25. A pin PWR is connected to the television power supply detecting circuit 26 for detecting whether the power is retained in a required level. Pin RMC is connected to the infrared transmitting circuit 27 via a switch 270.

The switching circuit 25 comprises a first, a second, and a third relay 251, 252, and 253 which are double pole double throw relays. The first relay 251 comprises two normally closed contacts connected to the interphone line, two common contacts respectively connected to two normally open contacts of the second relay 252 and further connected to the multifrequency decoding circuit 23. The second relay 252 comprises two normally closed contacts respectively connected to the telephone line 120, two common contacts respectively connected to two normally open contacts of the third relay 253 and further connected to the telephone status detecting circuit 22. The third relay 253 comprises two normally closed contacts connected to receive the 30-volt output voltage from the power supply 30, two common contacts connected to the telephone set 28.

The memory device 24 is provided for storing identification codes for different interphone means 20 and storing different transmitting signals of different remote control. The television power supply detecting circuit 26 comprises a first amplifier 260 connected in series with a second amplifier 262, where an inductance coil 261 is connected to the noninverse input terminal of the first amplifier 260. The inductance coil 261 is connected in series with a television power socket 50 which is connected in series with an alternating input terminal of the power supply 30. The inductance coil 261 induces different voltages when the television 2 is being turned on or turned off. The induced voltage is amplified by the amplifiers 260 and 262 and the amplified voltage is received by a pin PWR of the microprocessor 21. The microprocessor 21 detects the turning on or turning off of the television 2 by judging from the received voltage from the second amplifier 262. If the television 2 is originally in an off status, the microprocessor 21 will activate the infrared transmitting circuit 27 to turn on the television and switch the television to an audio/video input mode right after the user picks up the receiver of the telephone set 28 upon a visiting ring being sounded on the receiver of the telephone set 28. When the user hangs up the receiver of the telephone set 28, the television 2 is turned off by the infrared transmitting circuit 27 by a command from the microprocessor 21. If the user is watching television when a visitor operates the keypad 18, the user may turn off the switch 270 to prevent the visitor image from showing on the television screen. In the previous situation, if the user does not turn off the switch 270, the infrared transmitting circuit 27 will switch the television to the audio/video input mode thus enabling the visitor image to show on the television screen.

An infrared detecting circuit 40 is connected to an energization coil of the third relay 253 of the switching circuit 25 for antitheft purpose. Specifically, the infrared detecting circuit 40 comprises an infrared detector 41 connected to a delay circuit 42 via a switch 43. The detector 41 is placed in the apartment and is used to detect a human body approaching and outputs a drain of pulses in response. The delay circuit 42 is used to delay the pulses for a predetermined time period preventing from malfunction and intermittently energize the third relay 253 to intermittently couple the 30-volt AC voltage from the power supply 30 to the telephone set 28 to enable the latter to ring intermittently like a buzzer thus shocking the thief. When the switch 43 is manually turned on, the infrared detecting circuit 40 is in a working status, while the switch 43 is manually turned off, the infrared detecting circuit 40 is in an idle status.

With the above interphone system, a visiting signal resulted from operation of a visitor on the keypad 18 is transmitted to the indoor interphone means 20 via the bridge rectifier 19 and the interphone line 100. The visiting signal is transmitted through the first relay 251 of the switching circuit 25 and received by the multifrequency decoding circuit 23. The visiting signal is decoded by the multifrequency decoding circuit 23 and the decoded signal is received by the microprocessor 21. The microprocessor 21 energizes the second and third relays 252, 253 upon reception of the decoded visiting signal by respectively outputting a logical high voltage from pins INTC and BELL, thereby electrically connecting the telephone set 28 to the interphone line 100 via the three relays 251, 252, and 253 and causing the telephone set 28 to ring with a pattern other than normal telephone call ringing to inform the resident that a visitor is waiting outside the lobby. If the resident picks up the receiver of the telephone set 28, the interphone lines 100 will result in a voltage drop which is detected by the telephone status detecting circuit 22, and the microprocessor 21 will be informed of the voltage drop by the telephone status detecting circuit 22 and command the infrared transmitting circuit 27 to emit a signal to switch the television 2 to an audio/video input mode thus the visitor image is shown on the television 2, meanwhile the telephone status detecting circuit 12 of the outdoor interphone means 10 detects the voltage drop on the interphone line 100 and activates the direct speaking circuit 14 thus the visitor is allowed to talk with the resident. The resident may depress a predetermined key on the telephone set 28 to send out a lock release signal to the outdoor interphone means 10 via the interphone line 100 to open the electric lock after he/she has identified the visitor. Specifically, the multifrequency decoding circuit 13 of the outdoor interphone means 10 receives and decodes the lock release signal and the microprocessor 11 activates the electric lock control circuit 17 to open the electric lock upon reception of the decoded lock release signal from the multifrequency decoding circuit 13. When the resident hangs up the receiver of the telephone set 28, the voltage on the interphone line 100 is recovered to its original value, which is detected by the telephone status detecting circuit 22 and inform the microprocessor 21. The microprocessor 21 outputs a logical low voltage respectively in the pins BELL and INTC to deenergize the second and third relays 252 and 253 thus separating the telephone set 28 from the interphone line 100.

The microprocessor 21 of the indoor interphone means 20 may be preprogrammed to set a time period, such as one minute, for limiting the communication time period between the resident and the visitor possibly avoiding loss of an external telephone call in. In this case, the microprocessor 21 will automatically deenergize the second relay 252 to separate the telephone set 28 from the interphone line 100 after it has detected the voltage drop on the interphone line 100 for the predetermined time period, i.e., the communication between the resident and the visitor will be automatically cut off after it has lasted for one minute, and an external telephone call can come in.

If there is an external telephone call signal coming in the telephone line 120, the call signal is detected by the telephone status detecting circuit 22 via the second relay 252, which in turn informs the microprocessor 21 to energize the first and third relays 251 and 253 by respectively outputting a logical high voltage from pins SET and BELL. The energization of the first relay 251 causes a separation of the television set 28 from the interphone line 100. The energization of the first relay 251 and the third relay 253 causes an electrical connection between the telephone set 28 and the telephone line 120.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An interphone system comprising an outdoor interphone means and a plurality of indoor interphone means each of which is connected to the outdoor interphone means via a telephone line, a plurality of televisions electrically connected to a camera which monitors areas around a lobby door and sends an image taken therefrom to the televisions;

the outdoor interphone means including a keypad for outputting a specific signal representing one of the indoor interphone means upon depression by a visitor;

each of the indoor interphone means comprising a telephone set and a switching means which electronically connects the telephone set to the outdoor interphone means when the specific signal from the outdoor interphone means is received by the indoor interphone means and electrically connects the telephone set to a corresponding telephone line from a telephone exchange when an external telephone call is detected by the indoor interphone means, and means for setting the television into an audio/video input mode to show the visitor image when a receiver of the telephone set is picked up upon connection of the telephone set and the outdoor interphone means;

wherein the outdoor interphone means further comprises a microprocessor, a telephone status detecting circuit connected between the microprocessor and the interphone line, a multifrequency decoding circuit connected between the microprocessor and the interphone line, a direct speaking circuit connected between the microprocessor and the interphone line, a multifrequency encoding circuit connected to the microprocessor, a multifrequency dialing circuit connected between the multifrequency encoding circuit and the telephone line, an electrical lock control circuit connected to the microprocessor, and the keypad connected to the microprocessor;

wherein the indoor interphone means further comprises a microprocessor, a telephone status detecting circuit connected between the microprocessor and the interphone line, a multifrequency, decoding circuit connected between the microprocessor and the interphone line, a memory device storing an apartment number and being connected to the microprocessor, a switching circuit connected between the microprocessor and a telephone set, a television power supply detecting circuit connected to the microprocessor, and an infrared transmitting circuit connected to the microprocessor.

2. An interphone system as claimed in claim 1, wherein the electric lock control circuit is electrically connected to a conventional electric lock and the electric lock control circuit releases the electric lock upon activation.

* * * * *